United States Patent [19]

Haaf et al.

[11] 4,196,116

[45] Apr. 1, 1980

[54] IMPACT RESISTANT POLYPHENYLENE ETHER COMPOSITIONS CONTAINING EPDM RUBBER-MODIFIED ALKENYL AROMATIC RESINS AND HYDROGENATED DIBLOCK COPOLYMERS

[75] Inventors: William R. Haaf, Voorheesville; Glenn D. Cooper, Delmar, both of N.Y.

[73] Assignee: General Electric Company, Pittsfield, Mass.

[21] Appl. No.: 855,251

[22] Filed: Nov. 28, 1977

[51] Int. Cl.² .......................... C08K 3/32; C08K 7/14; C08L 53/00
[52] U.S. Cl. ........................... 260/42.18; 260/45.7 R; 260/45.7 P; 260/45.75 B; 260/45.9 NP; 525/68; 525/83; 525/95; 525/99
[58] Field of Search ............ 260/876 R, 876 B, 42.18, 260/45.7 P, 45.7 R, 45.75 B, 45.9 NP, 880 R, 878

[56] References Cited

U.S. PATENT DOCUMENTS

| | | | |
|---|---|---|---|
| 3,299,174 | 1/1967 | Kuhre et al. | 260/876 B |
| 3,333,024 | 7/1967 | Haefile et al. | 260/880 |
| 3,658,945 | 4/1972 | Nakashio et al. | 260/876 R |
| 3,943,191 | 3/1976 | Cooper et al. | 260/876 R |
| 3,960,808 | 6/1976 | Kutchman | 260/876 B |
| 3,981,841 | 9/1976 | Abolins et al. | 260/876 R |

*Primary Examiner*—J. Ziegler
*Attorney, Agent, or Firm*—Morgan, Finnegan, Pine, Foley & Lee

[57] ABSTRACT

Novel compositions are disclosed which include a polyphenylene ether resin, an alkenyl aromatic resin modified with an EPDM rubber, and a hydrogenated diblock copolymer. Also included within the scope of this invention are reinforced and flame-retardant compositions of the polyphenylene ether resin, the alkenyl aromatic resin modified with an EPDM rubber, and the hydrogenated diblock copolymer.

31 Claims, No Drawings

IMPACT RESISTANT POLYPHENYLENE ETHER COMPOSITIONS CONTAINING EPDM RUBBER-MODIFIED ALKENYL AROMATIC RESINS AND HYDROGENATED DIBLOCK COPOLYMERS

This invention relates to improved compositions of a polyphenylene ether resin, an alkenyl aromatic resin modified with an EPDM rubber, and a hydrogenated diblock copolymer. Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. No. 3,337,499; Blanchard et al., U.S. Pat. No. 3,219,626; Laakso et al., U.S. Pat. No. 3,342,892; Borman, U.S. Pat. No. 3,344,116; Hori et al., U.S. Pat. No. 3,384,619; Faurote et al., U.S. Pat. No. 3,440,217; Cooper et al., U.S. Pat. No. 3,661,848, U.S. Pat. No. 3,733,299, U.S. Pat. No. 3,838,102, and U.S. Pat. No. 3,988,297. Disclosures relating to metal based catalysts which do not include amines, are known from patents such as Wieden et al., U.S. Pat. No. 3,422,885 (copper-amidines); Nakashio et al., U.S. Pat. No. 3,573,257 (metal-alcoholate or phenolate); Kobayashi et al., U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver dioxide, etc., are described in Price et al., U.S. Pat. No. 3,382,212. Cizek, U.S. Pat. No. 3,383,435 discloses polyphenylene ether-styrene resin compositions. All of the above-mentioned disclosures are incorporated herein by reference.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers is improved.

Nakashio et al. U.S. Pat. No. 3,658,945 discloses that from 0.5 to 15% by weight of an EPDM-modified styrene resin may be used to upgrade the impact strength of polyphenylene ether resins. In Cooper et al., U.S. Pat. No. 3,943,191 it is disclosed that when the highly unsaturated rubber used in compositions of the type disclosed by Cizek, is replaced with EPDM rubber that has a low degree of residual unsaturation, the thermal oxidative stability and color stability are improved. The disclosures of the Nakashio et al. and Cooper et al. patents are incorporated herein by reference.

The impact strength of the Cooper et al. compositions is superior to that of a polyphenylene ether resin alone or that of similar compositions comprised of unmodified polystyrene; however, the impact strength of Cooper et al. compositions is inferior to that of similar compositions comprised of polystyrene modified with polybutadiene rubber, such as a composition known as FG-834, available from Foster-Grant Co. As is disclosed in Abolins et al., U.S. Pat. No. 3,981,841, the disclosure of which is incorporated herein by reference, the impact strength of the Cooper et al. compositions can be improved by incorporating therein impact modifiers such as an emulsion-grafted EPDM polystyrene copolymer. Commonly assigned, concurrently filed U.S. patent application Ser. No. 787,253, filed Apr. 13, 1977, incorporated herein by reference, discloses that a composition of a polyphenylene ether resin and an alkenyl aromatic resin modified with an EPDM rubber comprised of particles having a median diameter less than about two microns, preferably about 0.5 to 1.5 microns, is a very useful thermoplastic molding material having good thermal oxidative stability and impact strength comparable to that of compositions comprised of unsaturated rubber.

Higher impact strength can be obtained—without sacrificing thermal-oxidative stability, heat deflection temperature, or other properties—by adding certain types of block copolymers based on saturated rubber, such as hydrogenated A-B-A block copolymers or hydrogenated radial teleblock copolymers. These block copolymers are effective with compostiions made from the commercially available EPDM rubber-modified polystyrenes containing large rubber particles; however, much higher impact strength and improved surface appearance can be obtained by the use of polystyrene modified with small particle EPDM rubber. See commonly assigned, copending U.S. patent applications Ser. No. 838,373, filed Sept. 30, 1977, Ser. No. 855,252, filed Nov. 28, 1977; and Ser. No. 855,250, filed Nov. 28, 1977, the disclosures of which are incorporated herein by reference. The block copolymers are particularly useful in compositions containing a high proportion of polyphenylene ether resin since the amount of rubber which can be added to such compositions in the form of a styrene graft copolymer in ordinary high impact polystyrene may be too small for adequate toughening.

Unlike the triblock copolymers, diblock copolymers of styrene and rubber have little effect on impact strength when added to compositions comprised of polyphenylene ether resin and homopolystyrene. It has now been surprisingly discovered that when compositions are prepared from a polyphenylene ether resin, an EPDM rubber-modified alkenyl aromatic resin, and a hydrogenated diblock copolymer, of a vinyl aromatic compound and a rubber, the resulting compositions provide molded articles of improved impact strength.

It is, therefore, a primary object of this invention to provide improved compositions that are based on polyphenylene ether resins, modified alkenyl aromatic resins, and hydrogenated diblock copolymers of a vinyl aromatic compound and a rubber.

Another object of this invention is to provide molding compositions and molded articles that are based on a polyphenylene ether resin, an EPDM rubber-modified alkenyl aromatic resin, and a hydrogenated diblock copolymer of a vinyl aromatic compound and a rubber that have improved impact strength.

It is also an object of this invention to provide the above-described, improved molding compositions in reinforced and/or flame-retardant embodiments.

DESCRIPTION OF THE INVENTION

The above-mentioned advantages and objects and others will be readily apparent to those skilled in the art by the following compositions.

Preferred types will include thermoplastic compositions which comprise:

(a) from about 20 to about 80% by weight of a polyphenylene ether resin;

(b) from about 20 to about 80% by weight of an alkenyl aromatic resin modified with EPDM rubber; and (c) from about 1 to about 20% by weight of a selectively hydrogenated diblock copolymer of the A-B type, wherein block A is a polymerized vinyl aromatic hydrocarbon and block B is a polymerized conjugated diene, hydrogenated after polymerization.

The preferred polyphenylene ethers are of the formula

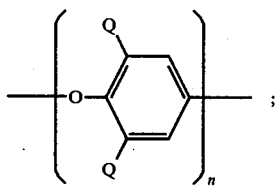

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene) ether.

The alkenyl aromatic resin should have at least 25% of its units derived from an alkenyl aromatic monomer of the formula

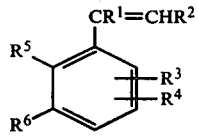

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with a hydrocarbyl groups to form a naphthyl group.

Specific examples of alkenyl aromatic monomers include styrene, bromostyrene, chlorostyrene, α-methylstyrene, vinylxylene, divinylbenzene, vinyl naphthalene, and vinyl-toluene.

The alkenyl aromatic monomer may be copolymerized with material such as those having the general formula

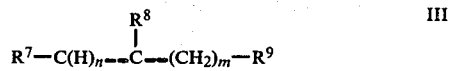

wherein the dotted lines each represent a single or a double carbon to carbon bond; $R^7$ and $R^8$ taken together represent a

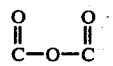

linkage; $R^9$ is selected from the group consisting of hydrogen, vinyl, alkyl of from 1 to 12 carbon atoms, alkenyl of from 1 to 12 carbon atoms, alkylcarboxylic acid of from 1 to 12 carbon atoms, and alkenylcarboxylic acid of from 1 to 12 carbon atoms; n is 1 or 2, depending on the position of the carbon-carbon double bond; and m is an integer of from 0 to about 10. Examples include maleic anhydride, citraconic anhydride, itaconic anhydride, aconitic anhydride, and the like.

The alkenyl aromatic resins include, by way of example, homopolymers such as homopolystyrene and monochloropolystyrene, and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene-acrylonitrile butadiene copolymers, poly-α-methylstyrene, copolymers of ethylvinylbenzene, divinylbenzene, and styrene maleic anhydride copolymer, and block copolymers of styrene butadiene and styrene-butadiene styrene.

The styrene-maleic anhydride copolymers are described in U.S. Pat. No. 2,971,939, U.S. Pat. No. 3,336,267, and U.S. Pat. No. 2,769,804, all of which are incorporated herein by reference.

The alkenyl aromatic resins are modified with EPDM rubbers, that is, rubbery interpolymers comprising mixtures of mono-olefins and a polyene, including those prepared from ethylene, an alpha-olefin, and a polyene. Preferred rubbery interpolymers comprise 10–90 mole percent of ethylene, 10–90 mole percent of an alpha-olefin containing 3–16 carbon atoms, and 0.1–12 mole percent of a polyene that is a non-conjugated cyclic or open-chain diene having 5–20 carbon atoms. Especially preferred are alpha-olefins having 3–10 carbon atoms and non-conjugated cyclic or open-chain dienes having 5–10 carbon atoms. Particularly preferred are those rubber interpolymers comprised of ethylene, propylene, and a polyene.

Preferably the EPDM rubber will be comprised of particles having a median diameter less than about two microns, most preably in the range of 0.5 to about 1.5 microns. The preparation of suitable small particle EPDM rubbers is described in copending U.S. patent application Ser. No. 787,253, filed Apr. 13, 1977, which is incorporated herein by reference.

Useful EPDM rubbers include the ethylene-propylene-ethylidene norbornene terpolymer and those described in Ritchie, *Vinyl and Allied Polymer,* Vol. 1, Page 121 (1968), which is incorporated herein by reference. The preferred EPDM rubbery interpolymers are those comprised of ethylene, propylene, and 5-ethylidene-2-norbornene; of ethylene propylene, and 1,4-hexadiene; and of ethylene, propylene, and dicyclopentadiene. Preferred modified alkenyl aromatic resins will include from about 4 to about 25% by weight of rubbery interpolymer.

The alkenyl aromatic resin modified with an EPDM rubber may be prepared by dissolving the rubber interpolymer in the alkenyl aromatic monomer and polymerizing the mixture, preferably in the presence of a free-radical initiator, until 90-100% by weight of the alkenyl aromatic monomer has reacted to form said EPDM rubber-modified alkenyl aromatic resin.

The diblock A-B copolymers of an alkenyl aromatic compound, A, and a polymerized conjugated diene, B, are derived from a monomer of Formula II. Typical monomers include styrene, alpha methyl styrene, vinyl xylene, ethyl vinyl xylene, vinyl naphthalene and the like, or mixtures thereof. The polymerized conjugated diene B is derived from a compound selected from the group consisting of 1,3-butadiene, 2-methyl-1,3-butadiene and 1,3-pentadiene. The total amount of the A component in the A-B block copolymers will be in the range of about 20 to 70 parts by weight per 100 parts by weight of block copolymer. The preferred A-B block copolymers are the styrene-butadiene block copolymers having about 20 to 70 parts by weight of styrene units per 100 parts by weight of block copolymer.

The A-B block copolymers may be made by procedures well known to those skilled in the art. For example, U.K. Pat. No. 1,145,923 discloses specific preparative methods for preparing block copolymers having a high content of alkenyl aromatic compound and materials such as KR 01 are commercially available from Phillips Petroleum Company. Hydrogenation of the A-B block is known in the art, and hydrogenated A-B block copolymers are commericially available.

It is preferred to form a diblock copolymer wherein block A has an average molecular weight of from 4,000 to 115,000 and block B, e.g., polybutadiene, has an average molecular weight of from 20,000 to 450,000. Still more preferably, the block A has an average molecular weight of from 8,000 to 60,000 while block B has an average molecular weight between 50,000 and 300,000. Block A will preferably comprise about 20 to 70% by weight, or more preferably, about 20 to 50% by weight of the total diblock copolymer.

The hydrogenated diblock copolymers are selectively hydrogenated in that only block B is hydrogenated. The hydrogenated diblock copolymers will have the average unsaturation of the rubber block reduced to less than 20% of the original value. It is preferred to have the unsaturation of the block B reduced to 10% or more preferably 5%, of its original value. Hydrogenation may be conducted utilizing a variety of hydrogenation catalysts such as nickel on Kieselguhr, Raney nickel, copper chromite, molybdenum sulfide and finely divided platinum or other noble metals on a carrier.

Hydrogenation may be conducted at any desired temperature or pressure, from atmospheric to 3000 p.s.i.g., the usual range being between 100 and 1000 p.s.i.g., at temperatures from 75° F. to 600° F., for times between 0.1 and 24 hours, preferably from 0.2 to 8 hours.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, and the tensile strength.

Although it is only necessary to have at least a reinforcing amount of the reinforcement present, in general, the combination of components (a), (b), and (c) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present. However, it is useful also to prepare the compositions containing substantially greater quantities, e.g., up to 70 to 80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 and 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art.

It is also a feature of this invention to provide flame-retardant thermoplastic compositions, as defined above, by modifying the composition to include a flame-retardant additive in a minor proportion but in an amount at least sufficient to render the composition self-extinguishing Such flame-retardant compositions include a halogenated organic compound, a halogenated organic compound in admixture with an antimony compound, elemental phosphorus, a phosphorus compound, compounds containing phosphorus-nitrogen bonds, or a mixture to two or more of the foregoing.

When used herein, the terms "self-extinguishing" and "non-dripping" are used to describe compositions which meet the standards of Underwriters' Laboratories Bulletin No. 94. Another recognized procedure to determine flame resistance of resinous compositons is the Oxygen Index Test or LOI (Limiting Oxygen Index). This test is a measure of a product's combustibilty based on the oxygen content of the combustion atmosphere. Appropriate speciments are placed in a combustion chimney, and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame-retardant additives in the specified amounts have a substantially higher oxygen index than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen. It is preferred that the flame-retardant additive comprise a halogenated organic compound (brominated or chlorinated); a halogen-containing organic compound in admixture with antimony oxide; elemental phosphorus or a phorphorus compound; a halogen-containing compound in admixture with a phosphorus compound or compounds containing phosphorus-nitrogen bonds; or a mixture of two or more of the foregoing.

The amount of flame-retardant additive used is not critical to the invention, so long as it is present in a minor proportion based on the polyphenylene ether-modified alkenyl aromatic polymer composition—major proportions will detract from physical properties—but at least sufficient to render the composition self-extinguishing. Those skilled in the art are well aware that the amount will vary with the nature of the polymers in the composition and with the efficiency of the additive. In general, however, the amount of additive will be from about 0.5 to 50 parts by weight per hundred parts of components (a), (b), and (c). A preferred range will be from about 1 to 25 parts, and an especially preferred range will be from about 3 to 15 parts of additive per hundred parts of (a), (b), and (c).

Smaller amounts of compound highly concentrated in the elements responsible for flame retardance will be sufficient, e.g., elemental red phosphorus will be preferred at about 0.5 to 10 parts by weight per hundred parts of (a), (b), and (c), while phosphorus in the form of triphenyl phosphate will be used at about 3 to 25 parts of phosphate per hundred parts of (a), (b), and (c), and so forth. Halogenated aromatics will be used at about 2 to 20 parts and synergists, e.g., antimony oxide, will be used at about 1 to 10 parts by weight per hundred parts of components (a), (b), and (c).

Among the useful halogen-containing compounds are those of the formula

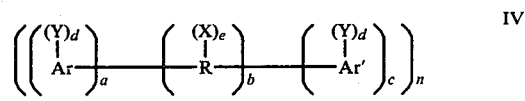

wherein n is 1 to 10 and R is an alkylene, alkylidene, or cycloaliphatic linkage, e.g., methylene, ethylene, propylene, isopropylene, isopropylidene, butylene, isobutylene, amylene, cyclohexylene, cyclophenylidene, and the like; or a linkage selected from the group consisting of ether; carbonyl; amine; a sulfur-containing linkage, e.g., sulfide, sulfoxide, or sulfone; carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be dihydric phenol, e.g., bisphenol-A, carbonate linkage. Other groups which are represented by R will occur to those skilled in the art. Compounds of this type are disclosed in U.S. Pat. No. 3,647,747 and U.S. Pat. No. 3,334,154, both of which are incorporated herein by reference.

Ar and Ar' are mono- or polycarbocyclic aromatic groups such as phenyl, biphenyl, terphenyl, naphthyl, and the like. Ar and Ar' may be the same or different.

X is a monovalent hydrocarbon group exemplified by the following: alkyl groups, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used, they may be alike or different.

Y is a substituent selected from the group consisting of organic, inorganic, and organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro, cyano, etc., said substituents being essentially inert provided there be at least one and preferably two halogen atoms per aryl, e.g., phenyl, nucleus.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0, and when b is 0, either a or c, but not both, may be 0. Where b is 0, the aromatic groups are joined by a direct carbon-carbon bond.

The hydroxyl and Y substituents on the aromatic groups, Ar and Ar', can be varied in the ortho, meta, or para positions on the aromatic rings, and the groups can be in any possible geometric relationship with respect to one another.

Included within the scope of the above formula are di-aromatics of which the following are representative:
2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane 2,3-bis-(4,6-dichloronaphthyl)propane 2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In the above examples sulfide, sulfoxy, and the like may be substituted in place of the divalent aliphatic group.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone, or mixed with antimony oxide.

In general, the preferred phosphorous compounds are selected from the group of elemental phosphorus and organic phosphonic acids, phosphonates, phosphine oxides, phosphines, phosphites, and phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

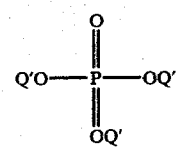

and nitrogen analogs thereof where such Q' represents the same or different radicals including hydrocarbon radicals such as alkyl, cycloalkyl, aryl, alkyl substituted aryl, and aryl substituted alkyl; halogen; hydrogen; and combinations thereof provided that at least one said Q' is aryl. Typical examples of suitable phosphates include phenylbisdodecyl phosphate, phenylbisneopentyl phosphate, phenylethylene hydrogen phosphate, phenylbis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolyphosphate, tritolyl phosphate, bis-(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q' is aryl. The most preferred phosphate is triphenyl phosphate. It is also preferred to use triphenyl phosphate in combination with hexabromobenzene and, optionally, antimony oxide. Especially preferred is a composition comprised of mixed triaryl phosphates, with one or more isopropyl groups on some or all of the aryl rings, such as Kronitex 50 supplied by Food Machinery Corporation.

Also suitable as flame-retardant additives for this invention are compounds containing phosphorus-nitrogen bonds, such as phosphonitrilic chloride, phosphorus ester amides, phosphoric acid amides, phosphonic acid amides. These flame-retardant additives are commercially available.

The compositions of the invention may be formed by conventional techniques, that is, by first dry mixing the components to form a premix, and then passing the premix through an extruder at an elevated temperature, e.g., 425° to 640° F.

By way of illustration, glass roving (a bundle of strands of filaments) is chopped into small pieces, e.g., ⅛" to 1" in length, and preferably less than ¼" in length and put into an extrusion compounder with (a) the polyphenylene ether resin, (b) the alkenyl aromatic resin that is modified with a rubbery interpolymer of a mixture of mono-olefins and a polyene, (c) the hydrogenated diblock copolymer, and (d) the flame-retardant additive(s), to produce molding pellets. The fibers are shortened and predispersed in the process, coming out at less than 1/16" long. In another procedure, glass filaments are ground or milled to short lengths, are mixed with the polyphenylene ether resin, the modified alkenyl aromatic polymer, the hydrogenated radial teleblock copolymer, and, optionally, flame-retardant additive(s), by dry blending, and then are either fluxed on a mill and ground, or are extruded and chopped.

In addition, compounding should be carried out to insure that the residence time in the machine is short; that the temperature is carefully controlled; that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLES I AND II

Two compositions were prepared by mixing together 50 parts of polyphenylene ether resin (PPO), 50 parts of EPDM-modified polystyrene, 3 parts of triphenyl phosphate, 1 part of decyldiphenyl phosphite, 1.5 parts of polyethylene, 0.15 parts of zinc oxide, and 0.15 parts of zinc sulfide and extruding at 570° F. in a 28 mm twin-screw extruder. The extruded pellets were then molded into standard test pieces in a 3 oz. screw injection molding machine (barrel 530° F. mold 200° F.). One composition was prepared from Taflite 925, an EPDM rubber-modified polystyrene having large rubber particles, available from Mitsui-Toatsu. The other composition, Experimental Copolymer A (EC-A), was prepared using an EPDM rubber modified-polystyrene prepared by a procedure similar to that described in Example 1 of U.S. patent application Ser. No. 787,253 but in a different reactor with a slower stirring speed. The modified polystyrene contained 10% of Epcar 387 (an EPDM rubber manufactured by B. F. Goodrich Chemical Co.) had had an average particle size of 1.5 microns. It contained 23.5% of toluene-insoluble gel with a swelling index of 10.0. The soluble polystyrene homopolymer fraction had an intrinsic viscosity of 0.96 dl/g.

A second series of compositions were prepared, extruded, and molded in the same way, except that 10 parts of the EPDM rubber-modified polystyrene was replaced by an equal amount of Shellvis 50, a styrene-saturated rubber diblock copolymer from Shell Chemical Co. During polymerization of the rubber portion of the block, the diene undergoes both 1,2 and 1,4-addition, so that, after hydrogenation, the rubber segment may be described as a copolymer of ethylene and 1-butene. Shellvis 50 has the composition: 36% polystyrene, 64% rubber. The molecular weight of the styrene segment is 37,000; the rubber segment has a molecular weight of 65,000. Impact strengths and heat distortion temperatures of the compositions are listed in the folowing table:

EXAMPLES III AND IV

Compositions containing 50 parts PPO and 50 parts EPDM-modified polystyrene, and compositions containing 50 parts PPO, 40 parts EPDM-modified polystyrene, and 10 parts Shellvis 50 diblock copolymer, were prepared, extruded, and molded as described in Examples I and II. The two EPDM-rubber modified polystyrenes used were experimental samples containing small-particle rubber, both containing 10% Epcar 387 EPDM rubber. Experimental Copolymer B(EC-B) had an average rubber particle diameter of 1.3 microns and contained 8.9% toluene-insoluble gel with a swelling index of 19.6. It also contained 3% of mineral oil. Experimental Copolymer C(EC-C) had an average particle diameter of 1.6 microns and contained 21.1% gel with a swelling index of 11.5. The formulations and physical properties are summarized in the following table:

TABLE 2.

| | COMPOSITION | | | PROPERTIES | | | | |
| --- | --- | --- | --- | --- | --- | --- | --- | --- |
| | PPO | EPDM Polystyrene | | Shellvis 50 | Izod Impact (ft. lbs./in.) | | HDT | Gardner (in/lbs) | |
| EXAMPLE | (parts) | (type) | (parts) | (parts) | (73° F.) | (−40° F.) | (°F.) | (73° F.) | (−40° F.) |
| C-3* | 50 | EC-B | 50 | — | 3.9 | 1.0 | 257 | 300 | 24 |
| III | 50 | EC-B | 40 | 10 | 6.2 | 1.2 | 258 | 350 | 75 |
| C-4* | 50 | EC-C | 50 | — | 4.6 | 1.2 | 258 | 380 | 36 |
| IV | 50 | EC-C | 40 | 10 | 9.2 | 2.0 | 259 | 350 | 210 |

*Control

It can be seen from the above tables that polyphenylene ether compositions containing a selectively hydrogenated diblock copolymer have significantly improved Izod impact strength.

Obviously, other modifications and variations of the present invention are possible in the light of the above teachings. It is, therefore, to be understood that changes may be made in the particular embodiments described above which are within the full intended scope of the invention as defined in the appended claims.

We claim:
1. A thermoplastic composition which, after molding, has good impact resistance, said composition comprising:
 (a) a polyphenylene ether resin;
 (b) an alkenyl aromatic resin, that is modified with a rubbery interpolymer of a mixture of mono-olefins and a polyene by polymerizing alkenyl aromatic monomer in the presence of the rubbery interpolymer, the rubbery interpolymer being comprised of particles having a median diameter less than about two microns; and
 (c) a hydrogenated diblock copolymer of the A-B type, wherein block A is a polymerized vinyl aromatic hydrocarbon and block B is a polymerized conjugated diene.

TABLE 1

| | COMPOSITION | | | PROPERTIES | | | |
| --- | --- | --- | --- | --- | --- | --- | --- |
| | PPO | EPDM-polystyrene | | Block Copolymer | | Izod Impact | HDT | |
| EXAMPLE | (parts) | (type) | (parts) | (type) | (parts) | (ft. lbs/in. notch) | (°F.) | Appearance |
| C-1* | 50 | Taflite 925 | 50 | — | — | 1.5 | | 237 |
| I | 50 | Taflite 925 | 40 | Shellvis 50 | 10 | 4.1 | | 239 |
| C-2* | 50 | EC-A | 50 | — | — | 2.3 | | 250 |
| II | 50 | EC-A | 40 | Shellvis 50 | 10 | 8.7 | | 258 |

*Control

2. The composition of claim 1 wherein the alkenyl aromatic resin is modified with a rubbery interpolymer of ethylene, an alpha-olefin, and a polyene.

3. The composition of claim 2 wherein the alpha-olefin is propylene.

4. The composition of claim 1 wherein the rubbery interpolymer comprises 10-90 mole percent of ethylene, 10-90 mole percent of an alpha-olefin having 3-16 carbon atoms, and 0.1-12 mole percent of a polyene that is a non-conjugated cyclic or open-chain diene having 5-20 carbon atoms.

5. The composition of claim 4 wherein the alpha-olefin is propylene.

6. The composition of claim 1 wherein the polyphenylene ether resin is selected from the compounds of the formula

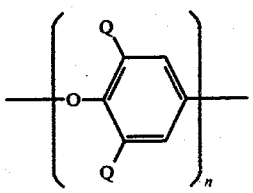

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

7. The composition of claim 1 wherein the alkenyl aromatic resin is prepared from a monomer selected from the group consisting of styrene, α-methylstyrene, bromostyrene, chlorostyrene, divinylbenzene, and vinyltoluene.

8. The composition of claim 1 wherein in the A-B diblock copolymer (c), the vinyl aromatic hydrocarbon of block A is selected from the group consisting of styrene, α-methyl styrene, vinyltoluene, vinyl xylene, and vinyl naphthalene and the conjugated diene of block B is selected from the group consisting of butadiene, 2-methyl-1,3-butadiene, 1,3-pentadiene, and 2,3-dimethylbutadiene.

9. The composition of claim 1 wherein in A-B diblock copolymer (c), block A has an average molecular weight of from about 4,000 to about 115,000 and block B has an average molecular weight of from about 20,000 to about 450,000.

10. The composition of claim 1 wherein the average unsaturation of block B has been reduced to less than 20% of its original value.

11. The composition of claim 1 wherein the composition includes a reinforcing amount of an inorganic reinforcing filler.

12. The composition of claim 11 wherein the composition includes from about 10 to about 50% by weight of fibrous glass filaments, based on the total weight of the composition.

13. The composition of claim 1 wherein the composition includes a flame-retardant amount of a flame-retardant additive.

14. The composition of claim 13 wherein the flame retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

15. A thermoplastic composition which, after molding, has good impact strength, said composition comprising:
(a) from about 20 to about 80% by weight of a polyphenylene resin;
(b) from about 20 to about 80% by weight of an alkenyl aromatic resin modified with a rubbery interpolymer which comprises 10-90 mole percent of ethylene, 10-90 mole percent of an alpha-olefin having 3-10 carbon atoms and 0.1-12 mole percent of a polyene that is a non-conjugated cyclic or open-chain diene having 5-10 carbon atoms, said modified resin resulting from polymerizing alkenyl aromatic monomer in the presence of the rubbery interpolymer so that said interpolymer is comprised of particles having a median diameter less than about two microns; and
(c) from about 1 to about 20% by weight of a selectively hydrogenated diblock copolymer of the A-B type, wherein block A is a polymerized vinyl aromatic hydrocarbon and block B is a polymerized conjugated diene.

16. The composition of claim 15 wherein the polyphenylene ether resin is poly(2,6-dimethyl-1,4-phenylene) ether.

17. The composition of claim 15 wherein the alpha-olefin is propylene.

18. The composition of claim 15 wherein the alkenyl aromatic monomer is styrene and the rubbery interpolymer is present in amounts between about 4% and about 25% by weight of the polymerized styrene and rubbery interpolymer combined.

19. The composition of claim 15 wherein the rubbery interpolymer comprises 10-90 mole percent of ethylene, 10-90 mole percent of propylene, and 0.1-12 mole percent of 5-ethylidene-2-norbornene.

20. The composition of claim 15 wherein the rubbery interpolymer comprises 10-90 mole percent of ethylene, 10-90 mole percent of propylene, and 0.1-12 mole percent of 1,4-hexadiene.

21. The composition of claim 15 wherein the rubbery interpolymer comprises 10-90 mole percent of ethylene, 10-90 mole percent of propylene, and 0.1-12 mole percent of dicyclopentadiene.

22. The composition of claim 15 wherein the composition also includes a reinforcing amount of an inorganic reinforcing filler.

23. The composition of claim 22 wherein the polyphenylene ether resin is poly(2,6-dimethyl-1,4-phenylene) ether.

24. The composition of claim 22 wherein the alpha-olefin is propylene.

25. The composition of claim 22 wherein the reinforcing filler comprises from about 10 to about 50% of fibrous glass filaments, based on the total weight of the composition.

26. The composition of claim 15 wherein the composition also includes a flame-retardant amount of a flame-retardant additive.

27. The composition of claim 26 wherein the alpha-olefin is propylene.

28. The composition of claim 26 wherein the flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

29. The composition of claim 26 wherein the flame-retardant additive comprises a mixture of an organic bromine-containing compound with antimony oxide.

30. The composition of claim 26 wherein the flame-retardant additive is triphenylphosphate.

31. The composition of claim 26 wherein the flame-retardant additive is comprised of a mixture of triaryl phosphates wherein one or more aryl groups are substituted by one or more isopropyl groups.

* * * * *

UNITED STATES PATENT AND TRADEMARK OFFICE
CERTIFICATE OF CORRECTION

PATENT NO. : 4,196,116
DATED : April 1, 1980
INVENTOR(S) : William Robert Haaf & Glenn Dale Cooper It is certified that error appears in the above-identified patent and that said Letters Patent are hereby corrected as shown below:

Col. 2, line 38, "compostiions" should read --compositions--;

and

Col. 8, line 23, "cyclophenylidene" should read --cyclopentylidene--.

Signed and Sealed this

Thirtieth Day of December 1980

[SEAL]

Attest:

SIDNEY A. DIAMOND

Attesting Officer

Commissioner of Patents and Trademarks